(12) United States Patent
Chu et al.

(10) Patent No.: US 9,920,231 B2
(45) Date of Patent: Mar. 20, 2018

(54) THERMAL COMPOUND COMPOSITION CONTAINING CU—CUO COMPOSITE FILLER

(71) Applicant: YOUNGYIEL PRECISION CO., LTD., Seoul (KR)

(72) Inventors: Dong-Wook Chu, Seoul (KR); Jae-Uk Chu, Seoul (KR); Dong-Woo Lee, Seoul (KR); Chang-Hyun Um, Seoul (KR)

(73) Assignee: YOUNGYIEL PRECISION CO., LTD., Seoul (KR)

( * ) Notice: Subject to any disclaimer, the term of this patent is extended or adjusted under 35 U.S.C. 154(b) by 0 days.

(21) Appl. No.: 15/458,648

(22) Filed: Mar. 14, 2017

(65) Prior Publication Data

US 2017/0292052 A1 Oct. 12, 2017

(30) Foreign Application Priority Data

Apr. 6, 2016 (KR) ........................ 10-2016-0042073

(51) Int. Cl.
*C09K 5/10* (2006.01)
*C09C 1/62* (2006.01)

(52) U.S. Cl.
CPC ................ *C09K 5/10* (2013.01); *C09C 1/627* (2013.01); *C01P 2004/16* (2013.01); *C01P 2004/54* (2013.01); *C01P 2004/80* (2013.01)

(58) Field of Classification Search
None
See application file for complete search history.

(56) References Cited

U.S. PATENT DOCUMENTS

2011/0188213 A1* 8/2011 Domae ................... C08L 83/04
361/748

FOREIGN PATENT DOCUMENTS

| KR | 1020030080250 | 10/2003 |
| KR | 1020030081091 | 10/2003 |
| KR | 1020050050560 | 5/2005 |
| KR | 1020060123131 | 12/2006 |
| KR | 1020080033336 | 4/2008 |
| KR | 1020100059684 | 6/2010 |
| KR | 1020100112637 | 10/2010 |
| KR | 1020120035878 | 4/2012 |

OTHER PUBLICATIONS

Zhang et al. "CuO nanostructures: Synthesis, characterization, growth mechanisms, fundamental properties, and applications" Progress in Materials Science, 60, 2014, 208-337 (Year: 2014).*

(Continued)

*Primary Examiner* — Robert S Loewe
(74) *Attorney, Agent, or Firm* — IPLA P.A.; James E. Bame

(57) ABSTRACT

Provided is a thermal compound composition having heat dissipation and electrical insulation properties, where the thermal compound composition includes a Cu—CuO composite filler having a Cu core and a shell composed of CuO having a whisker crystal structure. The CuO having the whisker crystal structure is prepared by reacting Cu particles in a basic solution so that an outer shell thereof is grown into whisker-shaped CuO.

7 Claims, 2 Drawing Sheets

(56) References Cited

OTHER PUBLICATIONS

Gulbransen et al. "Oxidation of Copper between 250 and 450 C and the Growth of CuO "Whiskers"", Journal of the Electrochemical Society, 1961, 119-122. (Year: 1961).*

Yujun et al. "Effects of multi-walled carbon nanotubes addition on thermal properties of thermal grease" International Journal of Heat and Mass Transfer, 74, 2014, 358-367. (Year: 2014).*

Mukherjee et al. "CuO nano-whiskers: Electrodeposition, Raman analysis, photoluminescence study and photocatalytic activity" Materials Letters 65, 2011, 3248-3250. (Year: 2011).*

* cited by examiner

THERMAL COMPOUND COMPOSITION CONTAINING CU—CUO COMPOSITE FILLER

BACKGROUND

The present invention relates to a thermal compound composition having not only high thermal conductivity but also an electrical insulation property. The thermal compound has to possess high thermal conductivity so as to ensure a heat dissipation function, but electrical conductivity is typically increased therewith due to the component used to increase thermal conductivity, and thus the use thereof is difficult in devices requiring an electrical insulation property. The present invention relates to a technique for a thermal compound composition having high thermal conductivity and a good electrical insulation property.

Due to the high integration of electronic parts, a large amount of heat is generated upon operating the parts, thus applying an excessive load to products and also having a negative influence on the performance and lifetime of the products. With the goal of solving the problem of heat generation in electronic parts, many attempts are made to synthesize and apply a heat-dissipating material so as to enhance the performance of products. Such a heat-dissipating material is exemplified by a thermal compound (or thermal grease).

A thermal compound is adhesive and contains silicone oil as a main resin thereof, and maintaining stable adhesion even under severe conditions is regarded as important. A thermal compound is typically prepared by mixing a silicone base with inorganic particles having high thermal conductivity as a heat-dissipating filler. Examples of the heat-dissipating filler used therefor may include alumina, boron nitride, aluminum nitride, zinc oxide, and magnesium oxide, all of which have high thermal conductivity so as to dissipate heat effectively.

The related technical documents for existing thermal compounds or thermal grease are as follows.

Korean Patent No. 10-0603490 discloses a silicone grease composition for heat radiation, which is thermal silicone grease that may exhibit stable thermal conductivity for a long period of time and is highly reliable, whereby oil pollutants are not generated and contact defects do not occur, the composition comprising (A) 100 parts by weight of organopolysiloxane having thixotropy α of 1.03 to 1.50 and a viscosity of 100 to 1,000,000 mm$^2$/s at 25° C., and (B) 100 to 2,000 parts by weight of a thermal conductive inorganic filler having an average particle size of 0.1 to 100 μm.

Also, Korean Patent No. 10-0786747 discloses a greasy silicone composition containing a large amount of a thickener and having high heat resistance, comprising (A) liquid organopolysiloxane composed of 80 to 96.5 mol % of a siloxane unit represented by the formula of $R_2SiO_{2/2}$, 1.0 to 10.0 mol % of a siloxane unit represented by the formula of $RSiO_{3/2}$, and 0.25 to 10.0 mol % of a siloxane unit represented by the formula of $R_3SiO_{1/2}$ (wherein individual Rs, which are the same as or different from each other, are a monovalent hydrocarbon group) and (B) a thermal conductive powder.

Also, Korean Patent No. 10-1073164 discloses a heat-dissipating silicone grease composition having high thermal conductivity and high coatability, comprising (A) 3 to 30 mass % of organopolysiloxane having a kinematic viscosity of 50 to 500000 mm$^2$/s at 25° C., (B) 60 to 96.9 mass % of a thermal conductive filler having a thermal conductivity of 10 W/(m·K) or more, and (C) 0.1 to 10 mass % of a solvent for dispersing or dissolving the (A) component.

Furthermore, Korean Patent Nos. 10-1155940 and 10-1336517, Korean Patent Application Publication No. 10-2010-0059684, Korean Patent No. 10-1498516, and Korean Patent Application Publication No. 10-2012-0035878 have also been disclosed.

These conventional related documents are mainly focused on improving the thermal conductivity of the thermal compound. However, electrical conductivity is also increased due to the component of the filler used for increasing thermal conductivity, and the use of such a thermal compound is limited to devices requiring electrical insulation properties due to problems related to short-circuits. Hence, the present invention has been devised to respond to the need for the development of a thermal compound having high thermal conductivity and a good electrical insulation property.

SUMMARY OF THE INVENTION

Accordingly, the present invention has been made keeping in mind the problems encountered in the related art, and the present invention is intended to provide a thermal compound composition that may exhibit both high thermal conductivity and a good electrical insulation property.

In particular, the present invention is intended to provide a filler component for a thermal compound composition, in which both heat dissipation properties and electrical insulation properties may be satisfied using a single component.

Therefore, the present invention provides a thermal compound composition comprising silicone oil and a filler, wherein the filler includes a Cu—CuO composite filler having an inner core composed of Cu and an outer shell composed of CuO having a whisker crystal structure.

In particular, the CuO having a whisker crystal structure is preferably prepared by reacting Cu particles in a basic solution so that an outer shell thereof is oxidized to grow whisker-shaped CuO.

In particular, the Cu—CuO composite filler preferably further includes AlN (Aluminum Nitride) as an additional filler component.

Furthermore, the filler may further include at least one selected from among $Al_2O_3$ and BN (Boron Nitride).

In particular, the filler is preferably used in an amount of 50 to 80 wt % based on the total weight of the thermal compound composition.

Furthermore, the AlN particles may have a size ranging from 20 nm to 50 μm.

Furthermore, the Cu—CuO composite filler preferably has an aspect ratio of 1:5 to 10.

According to the present invention, a thermal compound composition having high thermal conductivity and a good electrical insulation property can be prepared by using, as a filler, a Cu—CuO composite filler comprising a Cu core and a CuO shell, wherein the CuO has a whisker crystal structure. In particular, the CuO of the shell is structurally provided in the form of a protrusion having an acicular shape, and thus, contact with an additional filler such as AlN can become good, thereby increasing thermal conductivity.

Moreover, compared to a thermal compound of Comparative Example, using Cu in lieu of CuO, both thermal conductivity and electrical insulation properties can be increased, as is confirmed through experiments. Therefore, the Cu—CuO composite filler of the present invention can be found to be an advanced technique compared to existing thermal compound compositions using Cu.

DETAILED DESCRIPTION OF THE INVENTION

The present invention addresses a thermal compound composition having stable thermal conductivity and insulation voltage. The thermal compound composition according to the present invention includes silicone oil and a filler, the filler being a Cu—CuO composite filler having an inner core composed of Cu and an outer shell composed of CuO having a whisker crystal structure. In the present invention, the composite filler is used, whereby thermal conductivity is increased and electrical insulation properties became superior, compared to when Cu is used in conventional techniques. Hence, the present invention is an advanced technique compared to conventional thermal compounds using Cu, which may be confirmed through Comparative Example using Cu, as will be described later.

Figure 1:
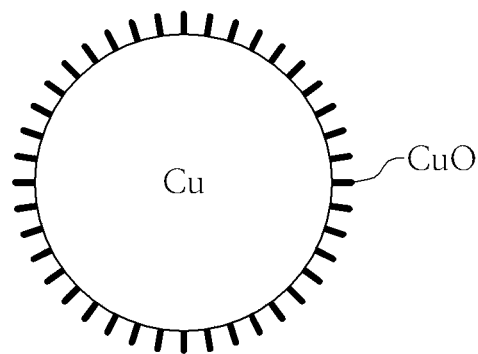
FIG. 1 shows the shape of a Cu—CuO composite filler according to the present invention.

FIG. 1 shows the shape of a Cu—CuO composite filler according to the present invention. The core is composed of a Cu component, and CuO having a whisker (acicular) crystal structure is formed on the outer surface of the core comprising Cu. While thermal conductivity is not decreased by the Cu in the core, electrical insulation properties are improved by the CuO in the shell. The CuO whisker crystal structure facilitates the contact with a peripheral additional heat-dissipating ceramic filler, for example, AlN, to thus increase thermal conductivity. CuO may be obtained from Cu particles having a diameter ranging from ones of nm to ones of μm through a basic reaction so that the surface of Cu is grown into a CuO structure, and CuO has a diameter ranging from tens of nm to hundreds of nm, with a length ranging from about hundreds of nm to ones of μm. CuO exhibits electrical insulation properties, and the metal conductor properties of Cu may decrease to thus prevent an electrical short-circuit and the thermal conductivity of Cu is transferred without change, thereby imparting high thermal conductivity and a good electrical insulation property according to the present invention.

Figure 2:
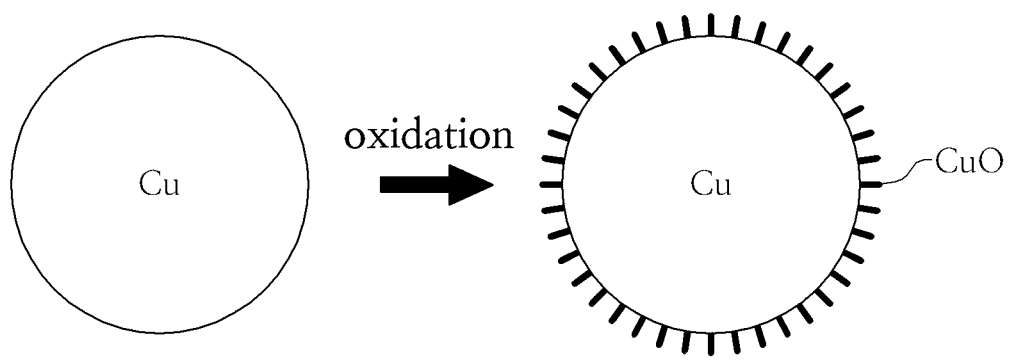
FIG. 2 schematically shows a process of preparing a Cu—CuO composite filler including CuO having a whisker crystal structure as a shell through oxidation of Cu particles.

FIG. 2 shows the formation of the CuO shell having a whisker crystal structure, wherein Cu on the surface of Cu particles is oxidized and coupled with oxygen, whereby the shell may be configured to include CuO having a whisker crystal structure. In the present invention, the shell is manufactured by converting Cu particles into CuO having a whisker crystal structure. The crystal growth of CuO from Cu may be performed through chemical precipitation. However, the shape of CuO is difficult to control using a typical precipitation process, and the particles are provided in the form of an acicular shape when synthesized in an aqueous solution. The CuO powder prepared via a liquid-phase process is synthesized into spherical $Cu(OH)_2$ using a hydration reaction. The powder thus obtained is manufactured in the form of acicular CuO through aging and the particles have a large size. This is because OH— present in the aqueous solution may cause the aggregation of particles. Hence, in order to control the size of CuO, the concentration of OH— in the solvent should be adjusted. Controlling the concentration of OH— may be carried out using an organic solvent as the solvent, in lieu of the aqueous solution. This process is mainly utilized in the synthesis of CuO nanopowder.

The aspect ratio of the Cu—CuO composite filler according to the present invention preferably falls in the range of 1:5 to 10. Cu—CuO having an aspect ratio falling out of the above range may be used, but Cu—CuO was synthesized within the above aspect ratio range based on the test results.

In the present invention, the thermal compound preferably further includes AlN (Aluminum Nitride), in addition to the Cu—CuO filler. AlN particles have a planar shape and a spherical shape having a diameter of about 20 nm to 50 μm. AlN, having high thermal conductivity and superior electrical insulation performance, is mainly employed in the thermal compound composition.

The Cu—CuO composite filler of the present invention may further include $Al_2O_3$ or BN. These two components are ceramic components that are mainly useful in a conventional thermal compound.

In the present invention, the filler including Cu—CuO is preferably used in an amount of 50 to 80 wt % based on the total weight of the composition. When $Al_2O_3$ and/or BN are used, it is preferred that the amount thereof not exceed 20 wt % based on the total weight of the thermal compound composition.

A better understanding of the present invention may be obtained through the following Test Example. In the present Test Example, Comparative Example using AlN and Cu and Example using AlN and Cu—CuO are compared.

Test Example

Particles were manufactured in a manner in which Cu having a size of about 100 nm was oxidized to thus form surface CuO having a whisker shape. The total diameter was set to the range of slightly larger than 100 nm due to the crystal growth of CuO. The Cu particles having a size of about 100 nm were uniformly dispersed in a basic aqueous solution including NaOH, and were then reacted at about 80° C. to form CuO on the surface of Cu particles. For reference, CuO is provided in the form of an oxide film having an aspect ratio that varies depending on the time and temperature, whereby optimal CuO whisker-type particles may be famed. Under conditions of excessive time and temperature, Cu particles are thoroughly converted into CuO, and thus the metal conductivity of Cu disappears, making it difficult to improve the properties thereof. The optimal temperature and time are regarded as very important. In this test, 100 nm Cu particles were reacted for 30 min, and tens of CuO whiskers were formed around the Cu particles.

Figure 3:
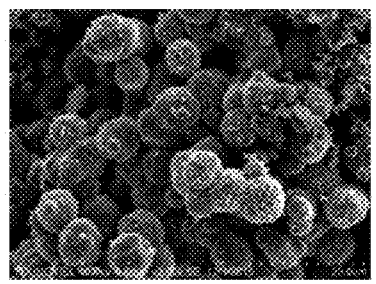
FIGS. 3 and 4 show SEM images of the Cu—CuO composite filler according to the present invention at different magnifications.
Figure 4:
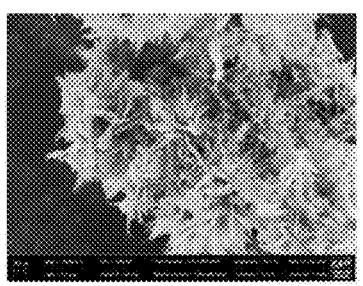

FIGS. 3 and 4 show SEM images of the Cu—CuO composite filler according to the present invention at different magnifications. As shown in FIGS. 3 and 4, CuO having a whisker crystal structure was formed on the surface of Cu of the present invention.

The Cu—CuO composite filler was mixed with AlN and thus used as a filler. In addition to AlN having a single size, AlN having various sizes may also be used, and the weight ratio of AlN to Cu—CuO to be mixed therewith was 7:1.

The mixed filler of Cu—CuO and AlN was mixed with silicone oil such as polydimethyl siloxane, thus completing a thermal compound composition. Here, the weight ratio of mixed filler to silicone oil was 5.3:1.

Two thermal compound samples of Comparative Example and Example of the present invention were analyzed for thermal conductivity and insulation voltage. The results are shown in Table 1 below.

TABLE 1

|  | AlN + Cu (Comparative Example) | AlN + CuO (Example) |
| --- | --- | --- |
| Thermal conductivity (W/mK) | 0.98 | 1.12 |
| Insulation voltage (kV) | 3.0 | 5.0 |

Compared to the thermal compound composition using Cu of Comparative Example, the thermal conductivity and insulation voltage of the thermal compound composition of Example according to the present invention were increased, thus improving heat dissipation properties and electrical insulation properties. This is deemed to be because CuO having a whisker shape of the shell of the Cu—CuO composite filler of the invention increased the contact with AlN, thus increasing thermal conductivity, and moreover, electrical insulation properties were improved due to CuO.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thermal compound composition comprising silicone oil and a filler, wherein the filler comprises a Cu—CuO composite filler configured to include a Cu core and a shell composed of CuO having a whisker crystal structure.

2. The thermal compound composition of claim 1, wherein the CuO having the whisker crystal structure is prepared by reacting Cu particles in a basic solution so that an outer shell thereof is grown into whisker-shaped CuO.

3. The thermal compound composition of claim 1, wherein the filler further comprises AlN (Aluminum Nitride).

4. The thermal compound composition of claim 3, wherein the filler further comprises at least one selected from among $Al_2O_3$ and BN (Boron Nitride).

5. The thermal compound composition of claim 1, wherein the filler is used in an amount of 50 to 80 wt % based on a total weight of the thermal compound composition.

6. The thermal compound composition of claim 3, wherein the AlN has a particle size ranging from 20 nm to 50 μm.

7. The thermal compound composition of claim 1, wherein the Cu—CuO composite filler has an aspect ratio of 1:5 to 10.

* * * * *